(12) United States Patent
Fujii

(10) Patent No.: US 10,079,957 B2
(45) Date of Patent: Sep. 18, 2018

(54) IMAGE READING APPARATUS, IMAGE FORMING APPARATUS, AND NON-TRANSITORY COMPUTER READABLE MEDIUM

(71) Applicant: FUJI XEROX CO., LTD., Tokyo (JP)

(72) Inventor: Masaru Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/007,700

(22) Filed: Jan. 27, 2016

(65) Prior Publication Data

US 2017/0064130 A1   Mar. 2, 2017

(30) Foreign Application Priority Data

Aug. 28, 2015   (JP) ................ 2015-168653

(51) Int. Cl.
  *H04N 1/32*   (2006.01)
(52) U.S. Cl.
  CPC . *H04N 1/32128* (2013.01); *H04N 2201/0094* (2013.01); *H04N 2201/3238* (2013.01); *H04N 2201/3243* (2013.01)
(58) Field of Classification Search
  None
  See application file for complete search history.

(56) References Cited

U.S. PATENT DOCUMENTS

| | | | | |
|---|---|---|---|---|
| 9,565,188 | B2* | 2/2017 | Basil | H04L 63/0861 |
| 2009/0059173 | A1* | 3/2009 | Azor | G03B 21/26 |
| | | | | 353/20 |
| 2012/0250086 | A1* | 10/2012 | Imayoshi | H04N 1/00244 |
| | | | | 358/1.15 |
| 2014/0362390 | A1* | 12/2014 | Takahata | G06F 3/1254 |
| | | | | 358/1.9 |
| 2015/0112719 | A1 | 4/2015 | Iwata et al. | |
| 2015/0242168 | A1* | 8/2015 | Yu | G06F 3/1208 |
| | | | | 358/1.13 |
| 2015/0312437 | A1* | 10/2015 | Hamaguchi | H04N 1/00798 |
| | | | | 358/474 |
| 2015/0371125 | A1* | 12/2015 | Ishii | G06F 3/1243 |
| | | | | 358/3.24 |

FOREIGN PATENT DOCUMENTS

JP   2015-082725 A   4/2015

* cited by examiner

*Primary Examiner* — Helen Zong
(74) *Attorney, Agent, or Firm* — Oliff PLC

(57) ABSTRACT

An image reading apparatus includes a reading unit, an addition unit, and a transfer unit. The reading unit reads image data from a document. The addition unit adds attribute information regarding a preset item to the image data read by the reading unit. The transfer unit transfers to a specified destination the image data to which the attribute information is added by the addition unit.

20 Claims, 19 Drawing Sheets

FIG. 7

| No. | NAME OF DOCUMENT TYPE | FIXED ATTRIBUTE ITEM | REQUIRED INPUT ATTRIBUTE ITEM | ARBITRARY INPUT ATTRIBUTE ITEM |
|---|---|---|---|---|
| 1 | CONTRACT WITH COMPANY A | No.1, No.2, No.3, No.4 | No.105 | NONE |
| 2 | CONTRACT WITH COMPANY B | No.1, No.2, No.3, No.4 | No.105 | NONE |
| 3 | TRANSPORTATION-FEE REIMBURSEMENT FORM | No.1, No.2, No.3, No.4 | No.101 | No.102, No.103, No.104 |
| 4 | MINUTES | No.1, No.2, No.3, No.4 | No.106 | No.108, No.110 |
| 5 | ANSWER-SHEET MARKING RESULT | No.1, No.2, No.3, No.4 | NONE | No.112, No.113, No.114, No.115 |

FIG. 8

| No. | ATTRIBUTE NAME | INITIAL VALUE OF ATTRIBUTE VALUE | TYPE OF ATTRIBUTE VALUE |
|---|---|---|---|
| 1 | DOCUMENT TYPE | #Document Type# | CHARACTER STRING |
| 2 | APPARATUS INFORMATION | #Device Name# | CHARACTER STRING |
| 3 | USER | #AUTHENTICATED User NAME# | CHARACTER STRING |
| 4 | SCAN DATE AND TIME | #Scan TIME# | DATE AND TIME |
| 101 | REASON FOR REIMBURSEMENT | | CHARACTER STRING |
| 102 | CHARGE | 0 | INTEGER |
| 103 | FILING DATE | #CURRENT DATE# | MONTH/DAY/YEAR |
| 104 | TYPE OF TRANSPORTATION USED | | CHARACTER STRING |
| 105 | MAIN RESPONSIBLE PERSON | #AUTHENTICATED User NAME# | CHARACTER STRING |
| ..... | ..... | ..... | ..... |

FIG. 10

```
SCAN TRANSFER APPLICATION (TRANSPORTATION-FEE REIMBURSEMENT FORM)

PLEASE INPUT ATTRIBUTE VALUE INTO THE FOLLOWING ITEM.

ATTRIBUTE NAME              ATTRIBUTE VALUE

REASON FOR                  PARTICIPATION
      REIMBURSEMENT               IN EXHIBITION

PLEASE SELECT FROM AMONG THE FOLLOWING ITEMS ITEMS TO BE
ADDED AS ATTRIBUTE INFORMATION, AND INPUT ATTRIBUTE VALUES.

FILING DATE    | NOT ADD ▼ |     —

CHARGE         |  ADD   ▼  |   980 YEN

TYPE OF
      TRANSPORTATION |  ADD   ▼  |   TRAIN
      USED

[ OK ]  [ CANCEL ]
```

FIG. 13

```
SCAN TRANSFER APPLICATION (ANSWER-SHEET MARKING RESULT)

PLEASE SELECT FROM AMONG THE FOLLOWING ITEMS
ITEMS TO BE ADDED AS ATTRIBUTE INFORMATION.
```

| ATTRIBUTE NAME | | ATTRIBUTE VALUE |
|---|---|---|
| MARKER | ADD ▼ | **RO **TA |
| DEGREE OF DIFFICULTY | NOT ADD ▼ | — |
| SUBJECT | ADD ▼ | JAPANESE |
| CLASS | ADD ▼ | CLASS 3, 2nd GRADE |

[ OK ]  [ CANCEL ]

FIG. 18

| No. | NAME OF DOCUMENT TYPE | FIXED ATTRIBUTE ITEM | REQUIRED INPUT ATTRIBUTE ITEM | ARBITRARY INPUT ATTRIBUTE ITEM |
|---|---|---|---|---|
| 1 | — | No.5, No.6 | NONE | NONE |

FIG. 19

| No. | ATTRIBUTE NAME | INITIAL VALUE OF ATTRIBUTE VALUE | TYPE OF ATTRIBUTE VALUE |
|---|---|---|---|
| 1 | DOCUMENT TYPE | #Document Type# | CHARACTER STRING |
| 2 | APPARATUS INFORMATION | #Device Name# | CHARACTER STRING |
| 3 | USER | #AUTHENTICATED User NAME# | CHARACTER STRING |
| 4 | SCAN DATE AND TIME | #Scan TIME# | DATE AND TIME |
| 5 | TRANSFER DATE AND TIME | #TRANSFER DATE AND TIME# | DATE AND TIME |
| 6 | FORWARDER | #AUTHENTICATED User NAME# | CHARACTER STRING |
| 101 | REASON FOR REIMBURSEMENT | | CHARACTER STRING |
| 102 | CHARGE | 0 | INTEGER |
| 103 | FILING DATE | #CURRENT DATE# | MONTH/DAY/YEAR |
| ..... | ..... | ..... | ..... |

IMAGE READING APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-168653 filed Aug. 28, 2015.

BACKGROUND

Technical Field

The present invention relates to an image reading apparatus, an image forming apparatus, and a non-transitory computer readable medium.

SUMMARY

According to an aspect of the invention, there is provided an image reading apparatus including a reading unit, an addition unit, and a transfer unit. The reading unit reads image data from a document. The addition unit adds attribute information regarding a preset item to the image data read by the reading unit. The transfer unit transfers to a specified destination the image data to which the attribute information is added by the addition unit.

BRIEF DESCRIPTION OF THE DRAWINGS

Exemplary embodiments of the present invention will be described in detail based on the following figures, wherein:

FIG. 7 is a diagram illustrating an example of attribute-information addition rules stored in an attribute-information addition rule storage unit;

FIG. 8 is a diagram illustrating an example of an attribute-information definition table stored in the attribute-information addition rule storage unit;

FIG. 10 is a diagram illustrating an example of a display screen showing the way in which attribute values of required input attribute items and arbitrary input attribute items are input in the case where "transportation-fee reimbursement form" is selected as the document type;

FIG. 13 is a diagram illustrating an example of a display screen showing the way in which attribute values of arbitrary input attribute items are input in the case where "answer-sheet marking result" is selected as the document type;

FIG. 18 is a diagram illustrating an example of attribute-information addition rules for a case where second attribute information is added; and FIG. 19 is a diagram illustrating an example of an attribute-information definition table according to the second exemplary embodiment of the present invention.

DETAILED DESCRIPTION

Next, exemplary embodiments of the present invention will be described in detail with reference to the drawings.

[First Exemplary Embodiment]

Figure 1:
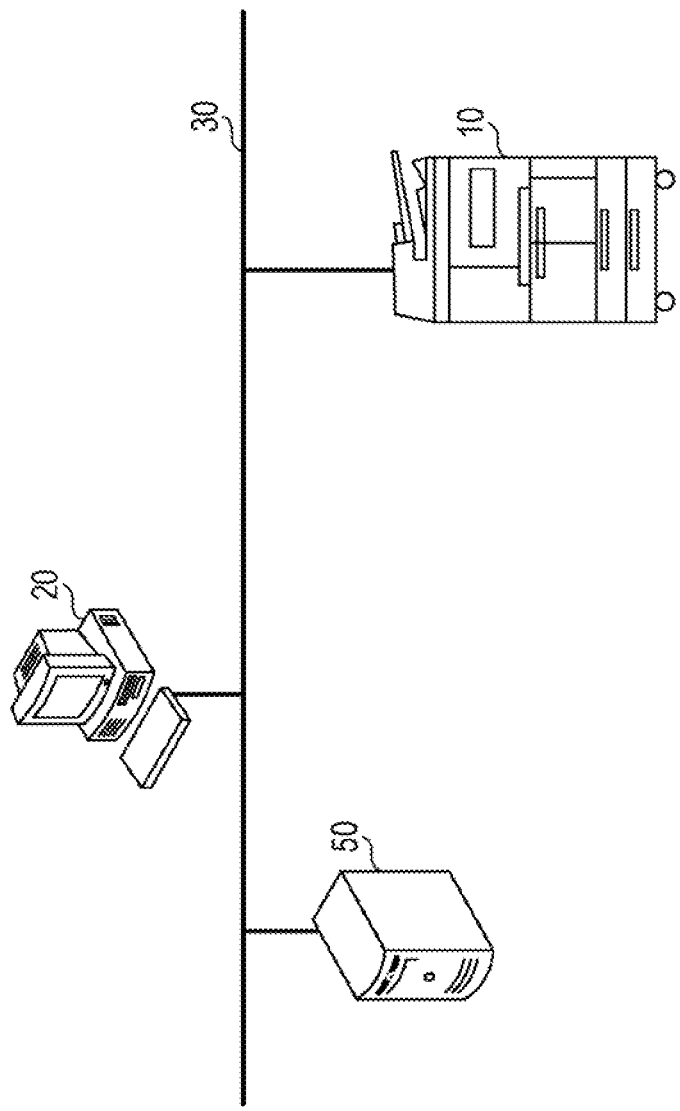
FIG. 1 is a diagram illustrating a system configuration of an image forming system according to a first exemplary embodiment of the present invention.

FIG. 1 is a diagram illustrating the configuration of an image forming system according to a first exemplary embodiment of the present invention.

The image forming system according to the first exemplary embodiment of the present invention includes, as illustrated in FIG. 1, an image forming apparatus 10, a terminal apparatus 20, and a server apparatus 50, which are connected to each other via a network 30. The terminal apparatus 20 generates print data, and transmits the generated print data to the image forming apparatus 10 via the network 30. The image forming apparatus 10 receives the print data transmitted from the terminal apparatus 20, and outputs onto a paper sheet an image corresponding to the print data. Note that the image forming apparatus 10 is an apparatus called a so-called multifunction machine having multiple functions such as a print function, a scan function, a copy function, and a facsimile function.

In addition, the server apparatus 50 is configured to be accessible from the terminal apparatus 20 and the image forming apparatus 10, and has the function of storing image data read by the image forming apparatus 10 and the function of transferring stored image data to the terminal apparatus 20.

Figure 2:
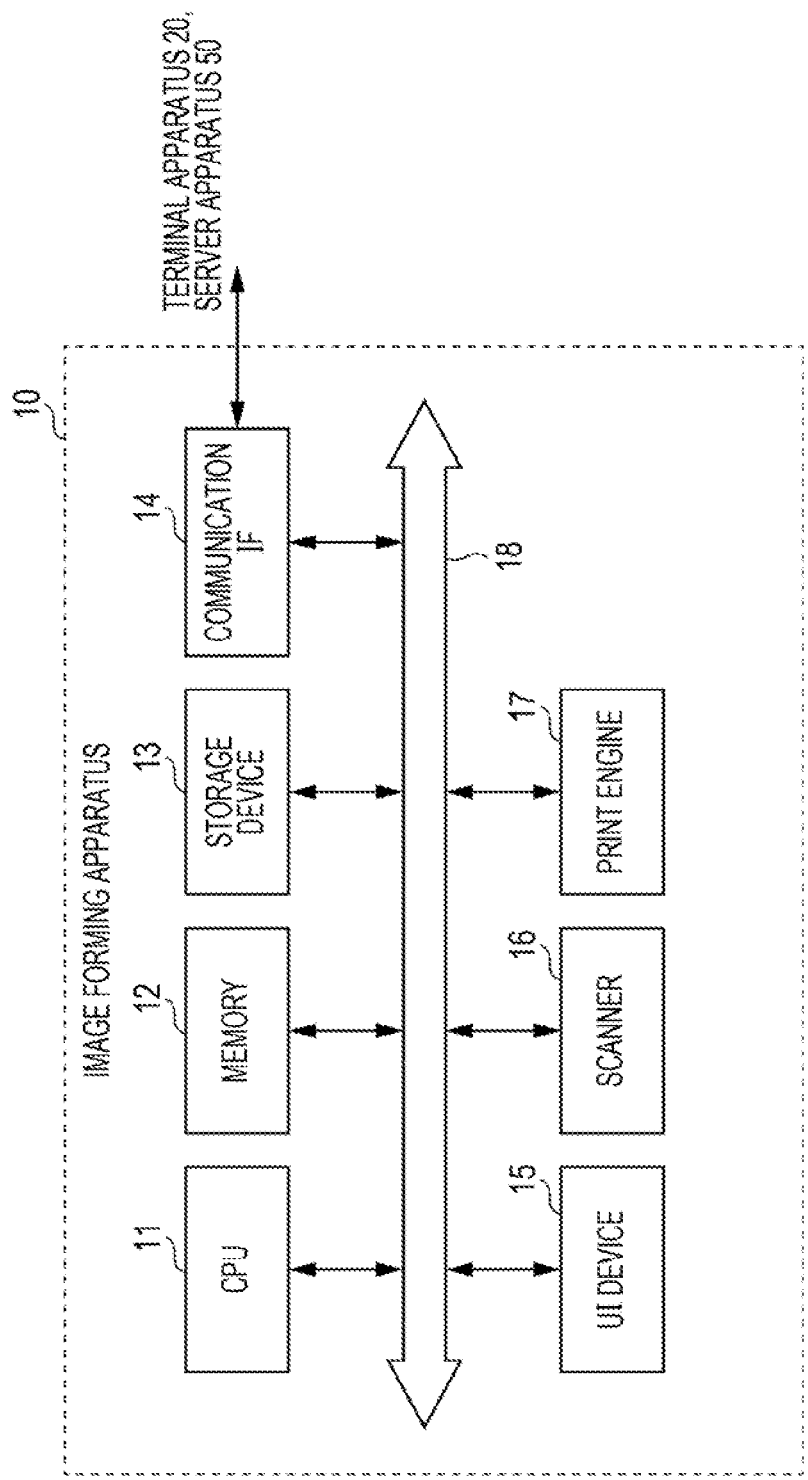
FIG. 2 is a block diagram illustrating a hardware configuration of an image forming apparatus according to the first exemplary embodiment of the present invention.

FIG. 2 illustrates a hardware configuration of the image forming apparatus 10 in the image forming system of the present exemplary embodiment.

The image forming apparatus 10 includes, as illustrated in FIG. 2, a central processing unit (CPU) 11, a memory 12, a storage device 13, a communication interface (IF) 14, a user interface (UI) device 15, a scanner 16, and a print engine 17. An example of the storage device 13 is a hard disk drive (HDD). The communication IF 14 performs data transmission and data reception to and from, for example, an external apparatus via the network 30. The UI device 15 includes a touch panel or a liquid crystal display and a keyboard. These elements are connected to each other via a control bus 18.

The print engine 17 prints an image on a recording medium such as a paper sheet for printing through processes such as charging, exposure, development, transfer, and fixing.

The CPU 11 executes certain processes in accordance with a control program stored in the memory 12 or the storage device 13, and controls an operation of the image forming apparatus 10. Note that it has been described in the present exemplary embodiment that the CPU 11 reads out and executes the control program stored in the memory 12 or the storage device 13; however, it is also possible to supply the control program to the CPU 11 using a storage medium such as a CD-ROM in which the control program is stored.

Figure 3:
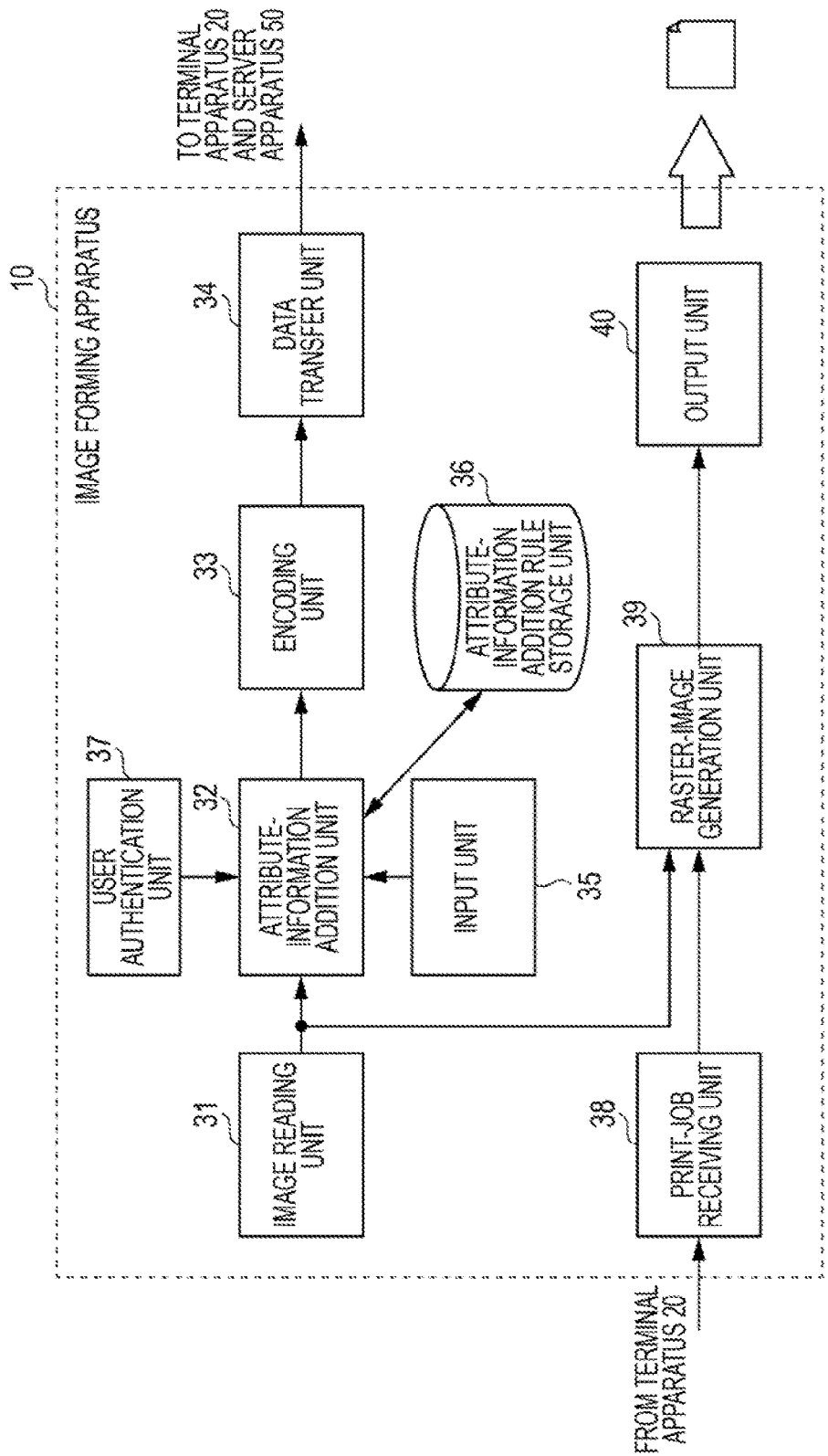
FIG. 3 is a block diagram illustrating a functional configuration of the image forming apparatus according to the first exemplary embodiment of the present invention.

FIG. 3 is a block diagram illustrating a functional configuration of the image forming apparatus 10 realized by execution of the above-described control program.

The image forming apparatus 10 of the present exemplary embodiment includes, as illustrated in FIG. 3, an image reading unit 31, an attribute-information addition unit 32, an encoding unit 33, a data transfer unit 34, an input unit 35, an attribute-information addition rule storage unit 36, a user authentication unit 37, a print-job receiving unit 38, a raster-image generation unit 39, and an output unit 40.

The image reading unit 31 serves as a reading unit that reads image data from a document.

The attribute-information addition unit 32 adds attribute information regarding preset items to the image data read by the image reading unit 31.

Here, the attribute information is information acquirable when the image reading unit 31 reads the image data, and is information unacquirable after the image data is transferred to for example an external server apparatus 50. That is, attribute information is information acquirable only at the time of execution of scanning.

For example, attribute information may be any piece of information or a combination of multiple pieces of information among document-type information about a document, apparatus information regarding an apparatus that has performed reading (for example, the model name of the apparatus and a management number), information regarding a user who has commanded reading (user information), and scan-date-and-time (reading-date-and-time) information.

The attribute-information addition rule storage unit 36 stores attribute-information addition rules for the case where the attribute-information addition unit 32 adds attribute information to image date. The attribute-information addition rule storage unit 36 also stores an attribute-information definition table in which for example attribute names and attribute values of items to be included in attribute information are defined.

The attribute-information addition unit 32 adds attribute information to image data by referring to the attribute-information addition rules and the attribute-information definition table stored in the attribute-information addition rule storage unit 36. Note that the details of these attribute-information addition rules and the attribute-information definition table will be described later.

The input unit 35 (a first input unit) inputs a document type selected for a document whose image data is to be read by the image reading unit 31. Then, the input unit 35 (a second input unit) inputs items to be added as attribute information and corresponding to the input document type.

The attribute-information addition unit 32 adds attribute information including the items input by the input unit 35 to the image data read by the image reading unit 31.

In addition, the attribute-information addition unit 32 may further add electronic-signature data to the image data to which the attribute information is added.

In the case where encoding of image data to be transferred is commanded, the encoding unit 33 encodes image data obtained after addition of attribute information is performed by the attribute-information addition unit 32.

The data transfer unit 34 transfers to a specified destination the image data to which the attribute information is added by the attribute-information addition unit 32 or image data obtained after encoding is performed by the encoding unit 33.

The user authentication unit 37 performs authentication of a user who has commanded execution of scanning, and acquires user information about this user. Thus, the attribute-information addition unit 32 acquires user information from the user authentication unit 37, and is able to include the acquired user information in attribute information.

The print-job receiving unit 38 receives a print job (a print command) transmitted from the terminal apparatus 20.

Then, the raster-image generation unit 39 generates raster print data for execution of printing in accordance with a print job received from the print-job receiving unit 38 and the image data read by the image reading unit 31.

The output unit 40 is configured to output, on a recording medium such as a paper sheet for printing, an image based on the image data read by the image reading unit 31 and an image based on the print job received by the print-job receiving unit 38. Specifically, the output unit 40 executes processing for printing on a recording medium an image based on the raster print data generated by the raster-image generation unit 39.

Figure 4:
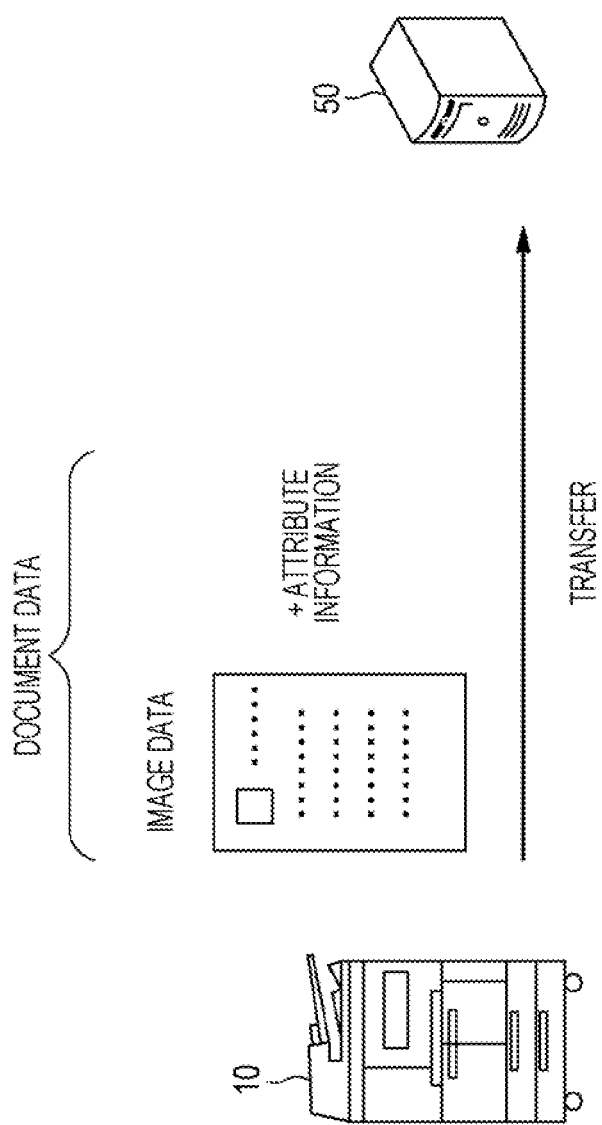
FIG. 4 is a diagram for describing the way in which image data to which attribute information is added is transferred from the image forming apparatus to a server apparatus.

With the above-described configuration, in the image forming apparatus 10 according to the present exemplary embodiment, information acquirable only at the time of image reading is added, as attribute information, to the image data read by the image reading unit 31, and the resulting data is transferred as document data to for example the server apparatus 50 as illustrated in FIG. 4.

Next, an operation of the image forming apparatus 10 according to the present exemplary embodiment will be described in detail with reference to the drawings.

Figure 5:
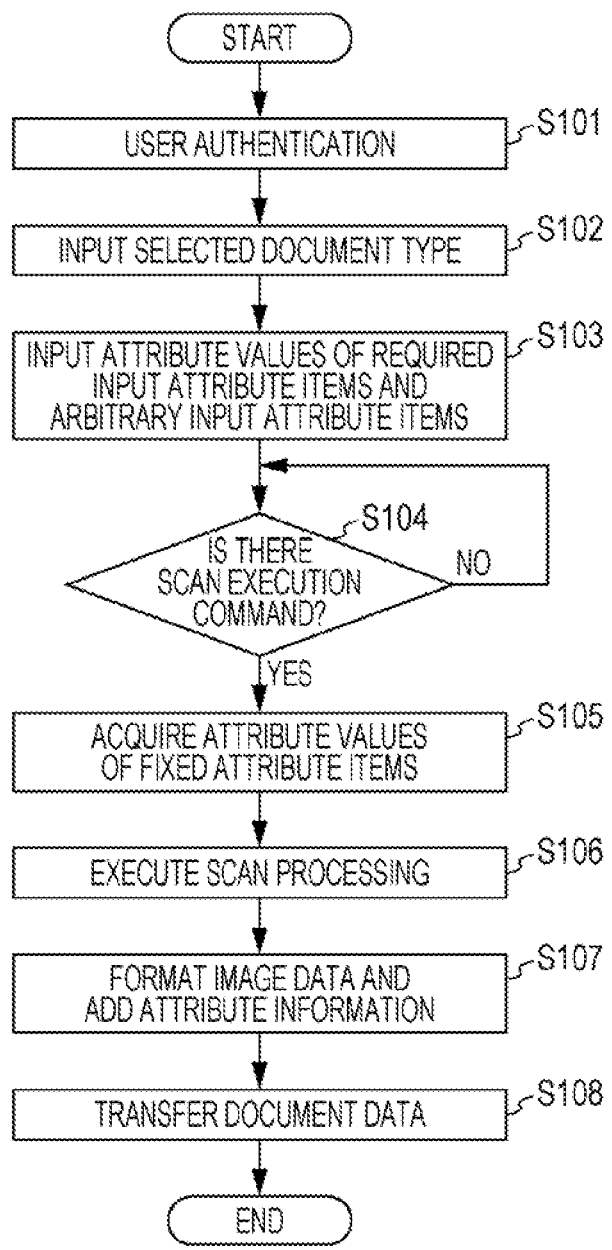
FIG. 5 is a flowchart for describing an operation performed when the image forming apparatus reads image data of a document and transfers the read image data to the server apparatus.

FIG. 5 is a flowchart for describing an operation performed when the image forming apparatus 10 reads image data of a document and transfers the read image data to the server apparatus 50.

First, after a scan transfer application software program is started up, the user authentication unit 37 performs authentication of a user who tries to perform scan processing (step S101).

Figure 6:
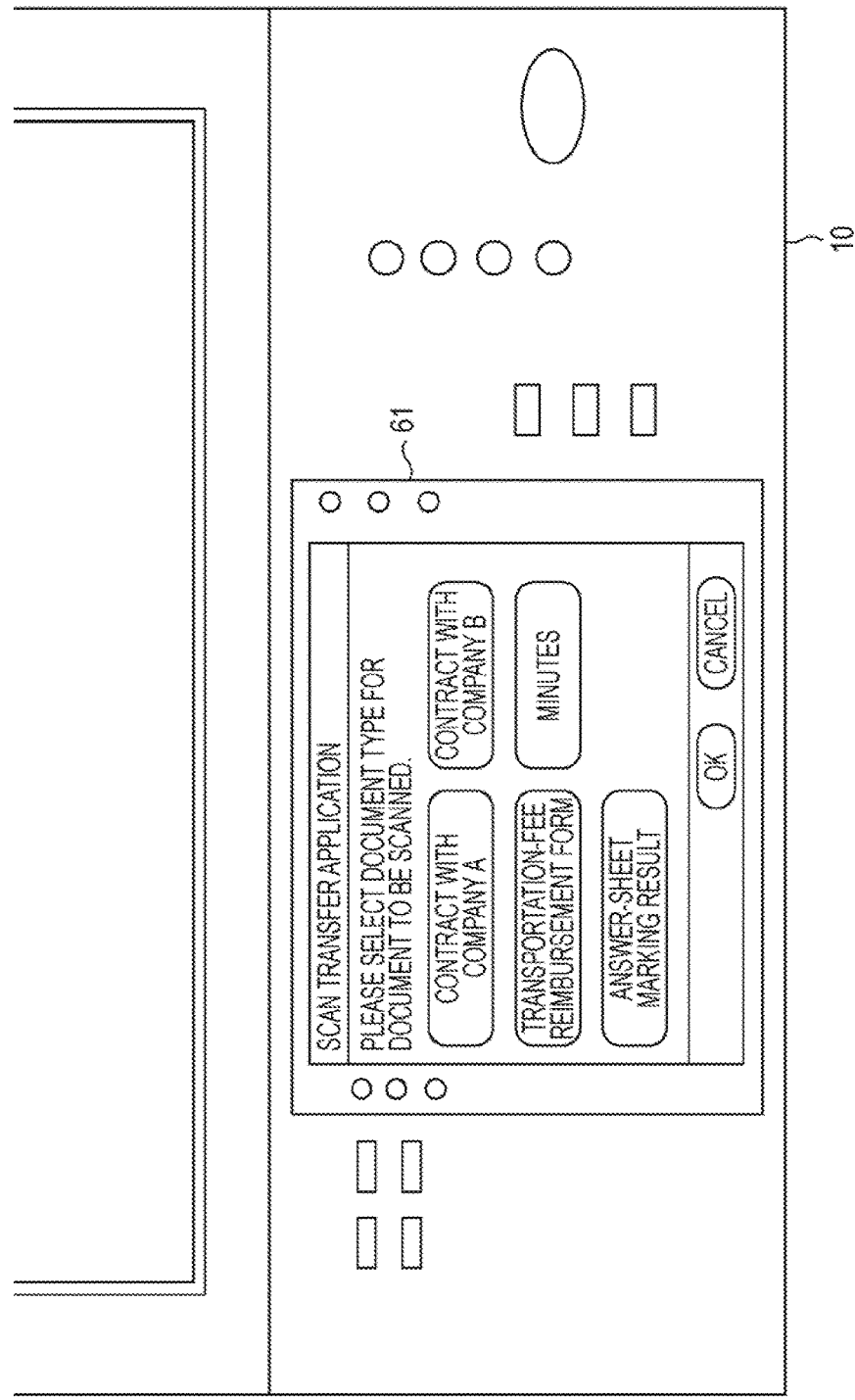
FIG. 6 is a diagram illustrating an example of a display screen displayed on an operation panel when a user is caused to select a document type for a document to be scanned.

Then, the input unit 35 causes the user to select a document type for a document to be scanned, by displaying for example a display screen as illustrated in FIG. 6 on an operation panel 61 of the image forming apparatus 10, and inputs a selected document type (step S102).

Then, the input unit 35 inputs attribute values of required input attribute items and arbitrary input attribute items corresponding to the selected document type in accordance with an operation performed by the user (step S103).

Note that the attribute information that the attribute-information addition unit 32 adds to image data read by the image reading unit 31 is constituted by fixed attribute items, required input attribute items, and arbitrary input attribute items.

A fixed attribute item is an attribute item preset in accordance with a selected document type, and an attribute value of the fixed attribute item is not input by a user but input automatically when scan processing is performed.

Specific examples of a fixed attribute item are a document type, apparatus information regarding an processing that performs scan processing, information regarding a user who has commanded execution of scanning, and information regarding a scan date and time, which is a date and time, when scanning is executed.

In addition, a required input attribute item is an attribute item for which a user is always requested to input an attribute value in accordance with a selected document type. For each document type, which attribute items are to be set as required input attribute items are preset by the attribute-information addition rules.

An arbitrary input attribute item is an attribute item for which a user is able to select in accordance with a selected document type whether or not to include the arbitrary input attribute in attribute information.

That is, for arbitrary input attribute items, the user is able to select, for each arbitrary input attribute item, whether or not to add the arbitrary input attribute item as attribute information to image data after a document type is selected.

Then, after a scan execution command is input by the input unit 35 (step S104), the attribute-information addition unit 32 acquires attribute values of fixed attribute items (step S105). Then, after the image reading unit 31 executes scan processing and reads image data from the document (step S106), the attribute-information addition unit 32 adds attribute information to the image data read by the image reading unit 31 (step S107). Then, the data transfer unit 34 transfers to a specified destination document data to which the attribute information is added (step S108).

In the case where document types as illustrated in FIG. 6 are selectable, an example of the attribute-information addition rules and an example of the attribute-information definition table stored in the attribute-information addition rule storage unit 36 will be illustrated in FIGS. 7 and 8.

In the example of the attribute-information addition rules illustrated in FIG. 7, it is clear that, for example, four attribute items such as No. 1, No. 2, No. 3, and No. 4 are set as fixed attribute items for a document type called "contract with company A".

It is clear with reference to the attribute-information definition table of FIG. 8 that attribute items whose attribute names are "document type", "apparatus information", "user", and "scan date and time" are defined for these four attribute items.

In addition, for the document type called "contract with company A", an attribute item called No. 105 is set as a required input attribute item. It is clear with reference to the attribute-information definition table of FIG. 8 that an attribute item whose attribute name is "main responsible person" is defined for this required input attribute item.

In this manner, it is clear from the attribute-information addition rules of FIG. 7 that, for document types such as "contract with company A", "contract with company B", "transportation-fee reimbursement form", "minutes", and "answer-sheet marking result", fixed attribute items, required input attribute items, and arbitrary input attribute items are set for each document type.

In addition, it is clear that an attribute name, an initial value of an attribute value, and an attribute value type are set for each attribute item in the attribute-information definition table illustrated in FIG. 8.

Next, an operation performed in a case where a specific document type is selected will be specifically described.

Figure 9:
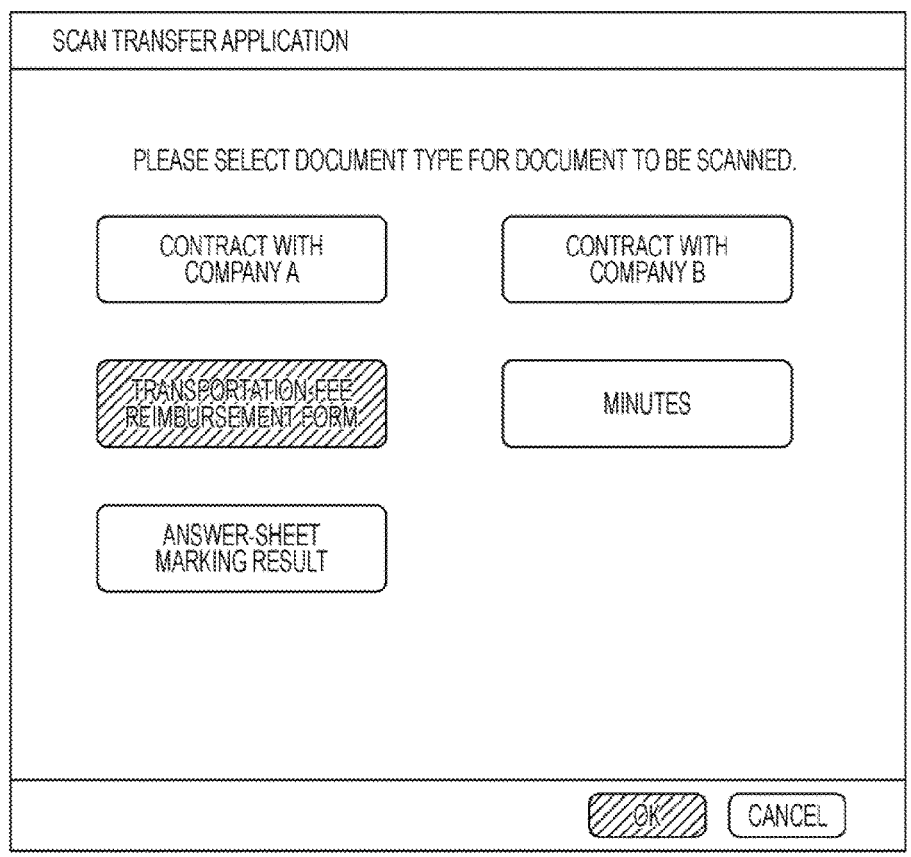
FIG. 9 is a diagram illustrating an example of a display screen displayed in the case where "transportation-fee reimbursement form" is selected as the document type on the display screen illustrated in FIG. 6.

For example, description will be made using a case where "transportation-fee reimbursement form" is selected as a document type as illustrated in FIG. 9 on the display screen illustrated in FIG. 6. Note that the example of the display screen illustrated in FIG. 9 shows in an enlargement manner only the content illustrated in FIG. 6 and displayed on the operation panel 61.

"Transportation-fee reimbursement form" is selected as a document type and an OK button is pressed down on the display screen of FIG. 9. Then, a display screen as illustrated in FIG. 10 is displayed, and attribute values of a required input attribute item and arbitrary input attribute items are input.

In the attribute-information addition rules illustrated in FIG. 7, an attribute item for No. 101, that is, an attribute item whose attribute name is "reason for reimbursement" is a required input attribute item for the document type called "transportation-fee reimbursement form".

Thus, as in the example of the display screen illustrated in FIG. 10, the attribute item called "reason for reimbursement" is set such that the user is unable to select whether or not to add "reason for reimbursement" as attribute information.

Note that attribute items called "filing date", "charge", and "type of transportation used" are arbitrary input attribute items, and thus the user is able to select, for each of the arbitrary input attribute items, whether or not to add the arbitrary input attribute item as attribute information.

Then, when the user inputs attribute values of the required input attribute item and arbitrary input attribute items selected to be added as attribute information, the attribute values are input by the input unit 35.

It is clear in the example illustrated in FIG. 10 that an attribute value of "participation in exhibition" is input for the attribute item called "reason for reimbursement", an attribute value of "980 yen" is input for the attribute item called "charge", and an attribute value of "train" is input for the attribute item called "type of transportation used".

Figure 11:
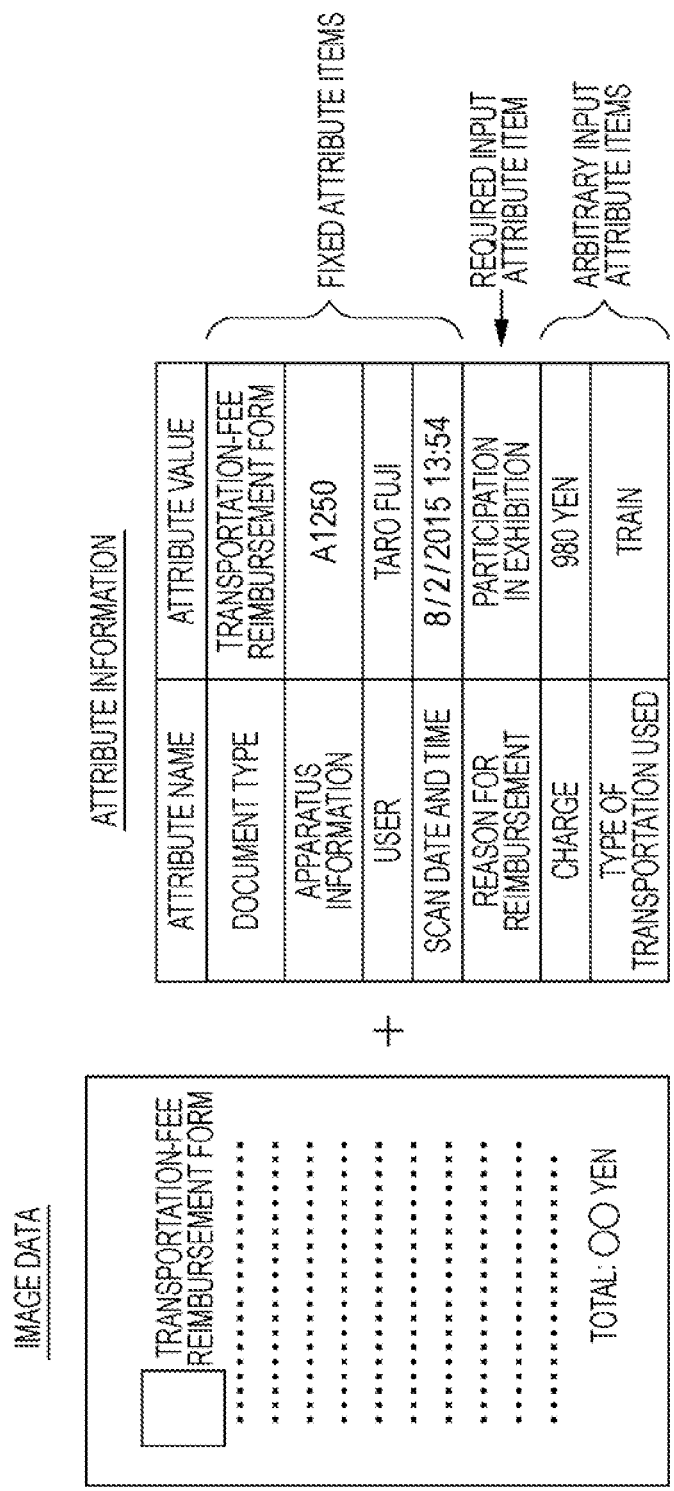
FIG. 11 is a diagram illustrating an example of image data to which attribute information is added by an attribute-information addition unit in the case where "transportation-fee reimbursement form" is selected as the document type.

FIG. 11 illustrates an example of image data to which attribute information is added by the attribute-information addition unit 32 as a result of performance of such input.

It is clear in the image data illustrated in FIG. 11 that attribute information is added, the attribute information being constituted by fixed attribute items called "document type", "apparatus information", "user", and "scan date and time", an required input attribute item called "reason for reimbursement", and arbitrary input attribute items called "charge" and "type of transportation used".

Note that attribute values are automatically acquired for the fixed attribute items and generated as attribute information by the attribute-information addition unit 32. Thus, the user does not have to input attribute values for the fixed attribute items.

Figure 12:
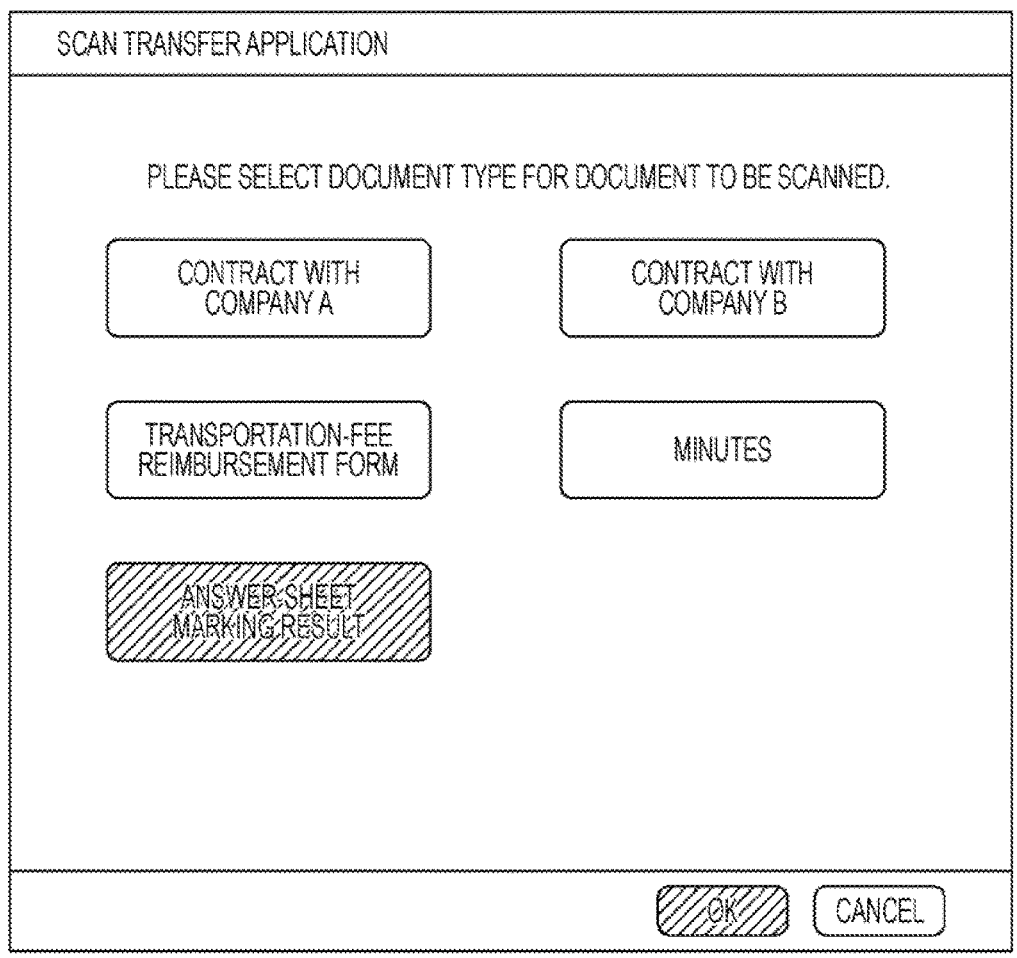
FIG. 12 is a diagram illustrating an example of a display screen displayed in the case where "answer-sheet marking result" is selected as the document type on the display screen illustrated in FIG. 6.

In addition, a case where for example a document type called "answer-sheet marking result" is selected on the display screen illustrated in FIG. 6 is illustrated on a display screen illustrated in FIG. 12.

"Answer-sheet marking result" is selected as a document type and the OK button is pressed down on the display screen of FIG. 12. Then, a display screen as illustrated in FIG. 13 is displayed, and attribute values of arbitrary input attribute items are input.

In the attribute-information addition rules illustrated in FIG. 7, no required input attribute item is set for the document type called "answer-sheet marking result". Thus, all the displayed attribute items are arbitrary input attribute items in an example of the display screen illustrated in FIG. 13.

In this example of the display screen illustrated in FIG. 13, attribute items whose attribute names are "marker", "subject", and "class" are selected as attribute information to be added, and an attribute item whose attribute name is "degree of difficulty" is selected as attribute information that is not to be added.

It is clear in the example illustrated in FIG. 13 that an attribute value of "RO TA" is input for the attribute item called "marker", an attribute value of "Japanese" is input for the attribute item called "subject", and an attribute value of "class 3, 2nd grade" is input for the attribute item called "class".

Figure 14:
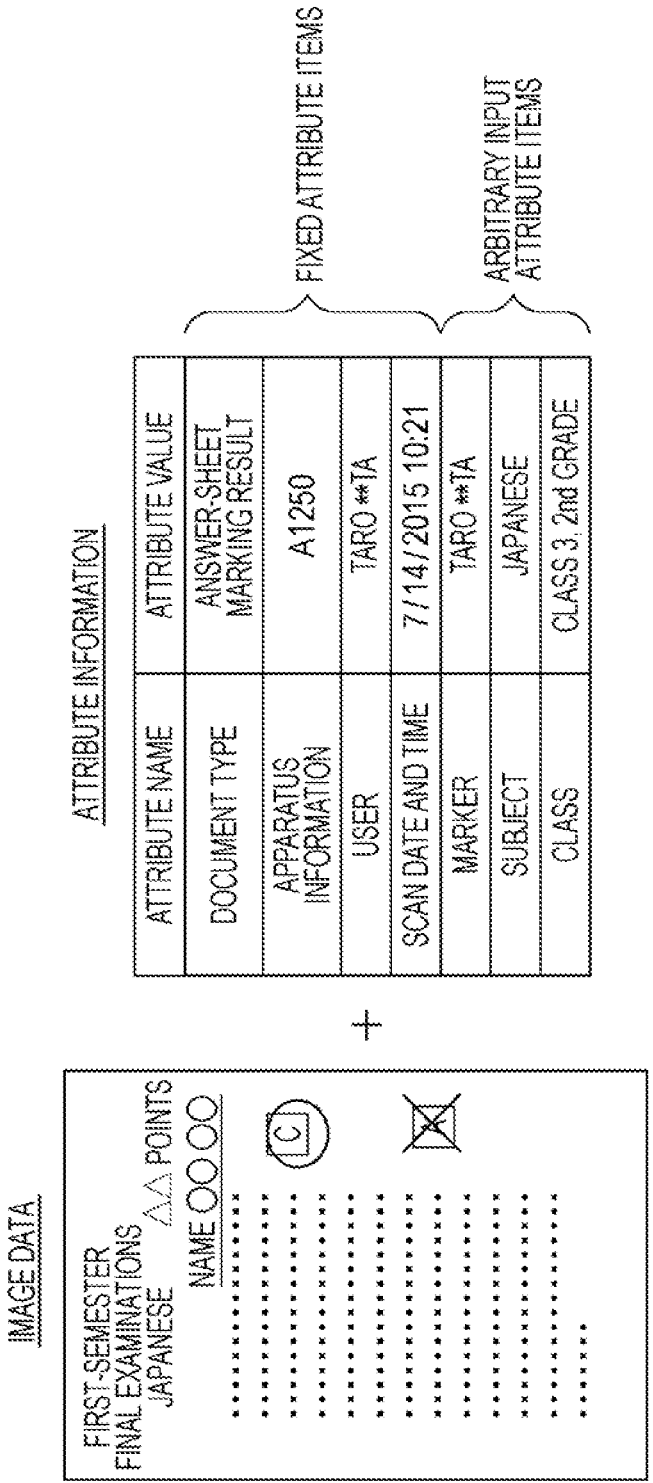
FIG. 14 is a diagram illustrating an example of image data to which attribute information is added by the attribute-information addition unit in the case where "answer-sheet marking result" is selected as the document type.

FIG. 14 illustrates an example of image data to which attribute information is added by the attribute-information addition unit 32 as a result of performance of such input.

It is clear in the image data illustrated in FIG. 14 that attribute information is added, the attribute information being constituted by fixed attribute items called "document type", "apparatus information", "user", and "scan date and time", and arbitrary input attribute items called "marker", "subject", and "class".

In this manner, in the image forming apparatus 10 of the present exemplary embodiment, when the user selects a document type for a document to be scanned, attribute information regarding preset attribute items corresponding to this document type is added to image data, which has been read, and thereafter the resulting data is transferred to a specified destination such as the server apparatus 50.

[Second Exemplary Embodiment]

Next, an image forming system according to a second exemplary embodiment of the present invention will be described.

The image forming system according to the second exemplary embodiment of the present invention has the configuration of the image forming system according to the first exemplary embodiment and illustrated in FIG. 1 except that the image forming apparatus 10 is replaced with an image forming apparatus 10a.

Figure 15:
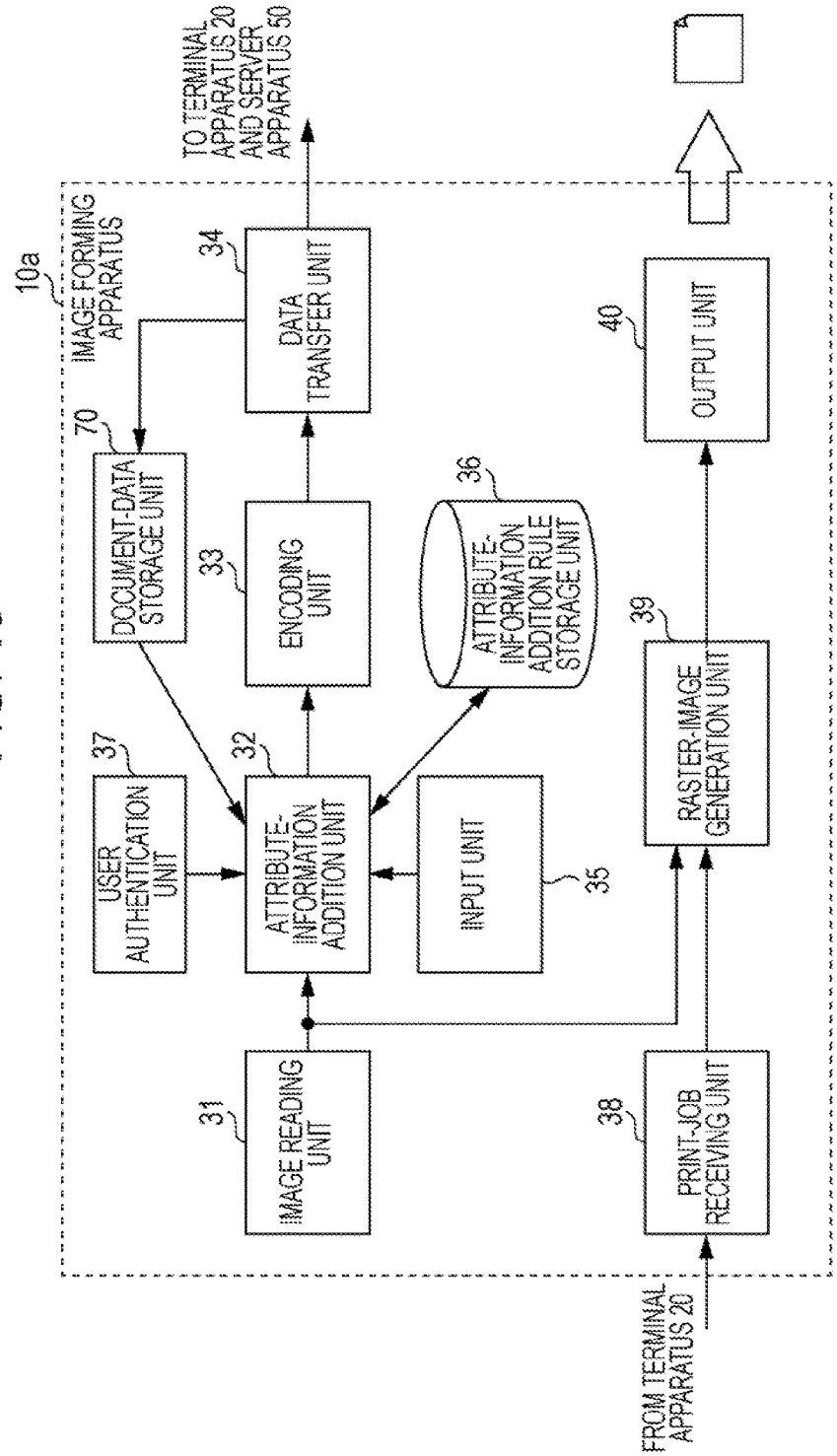
FIG. 15 is a block diagram illustrating a functional configuration of an image forming apparatus according to a second exemplary embodiment of the present invention.

Then, as illustrated in FIG. 15, the image forming apparatus 10a according to the present exemplary embodiment has a configuration obtained by adding a document-data storage unit 70 to the image forming apparatus 10 according to the first exemplary embodiment and illustrated in FIG. 3.

Since the image forming apparatus 10a according to the present exemplary embodiment has substantially the same configuration as the image forming apparatus 10 illustrated in FIG. 3 except for addition of the document-data storage unit 70, description thereof will be omitted.

In the image forming apparatus 10a according to the present exemplary embodiment, the data transfer unit 34 not only transfers document data that is read by the image reading unit 31 and to which attribute information is added by the attribute-information addition unit 32, but also be able to perform an operation for storing the document data in the document-data storage unit 70.

After the document data is stored, when transfer of the document data is commanded, the attribute-information addition unit 32 adds, to the document data stored in the document-data storage unit 70, attribute information (second attribute information) different from attribute information (first attribute information) that is first added such as a transfer date and time and a forwarder. The data transfer unit 34 transfers to a specified destination image data to which attribute information is added again.

In this manner, in the present exemplary embodiment, the attribute-information addition unit 32 (a first addition unit) adds first attribute information regarding preset items to image data read by the image reading unit 31. Then, the image data to which the first attribute information is added by the attribute-information addition unit 32 is stored in the document-data storage unit 70.

In the case where transfer of the image data stored in the document-data storage unit 70 is commanded, the attribute-information addition unit 32 (a second addition unit) adds second attribute information to the image data transfer of which is commanded.

Then, the data transfer unit 34 transfers to a specified destination the image data to which the second attribute information is added by the attribute-information addition unit 32.

Next, an operation of the image forming apparatus 10a according to the present exemplary embodiment will be described in detail with reference to the drawings.

First, an operation performed when the image forming apparatus 10a reads image data of a document and stores the read image data in the image forming apparatus 10a will be described with reference to a flowchart illustrated in FIG. 16.

Figure 16:
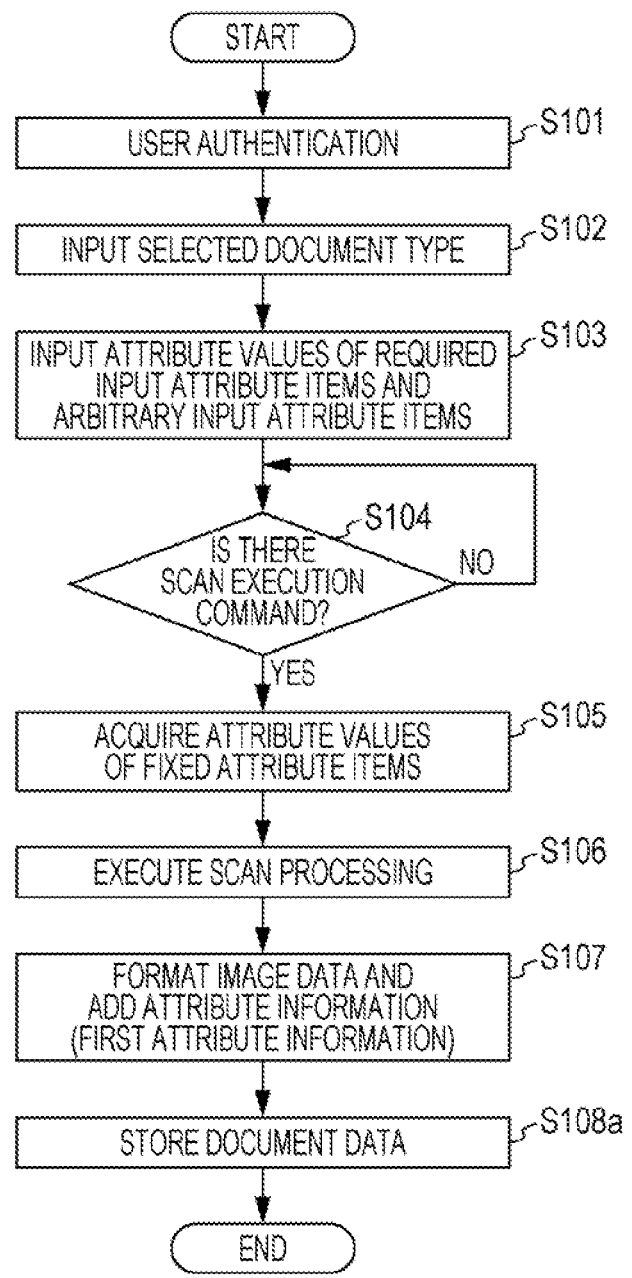
FIG. 16 is a flowchart for describing an operation performed when the image forming apparatus reads image data of a document and stores the read image data in the image forming apparatus.

The flowchart illustrated in FIG. 16 is the same as the flowchart illustrated in FIG. 5 except that the processing in step S108 is replaced with processing in step S108a.

Here, it is commanded that image data read by the image reading unit 31 is not immediately transferred to a specified destination but is stored in the image forming apparatus 10a. Thus, document data to which attribute information (first attribute information) is added by the attribute-information addition unit 32 is stored in the document-data storage unit 70 (step S108a).

Figure 17:
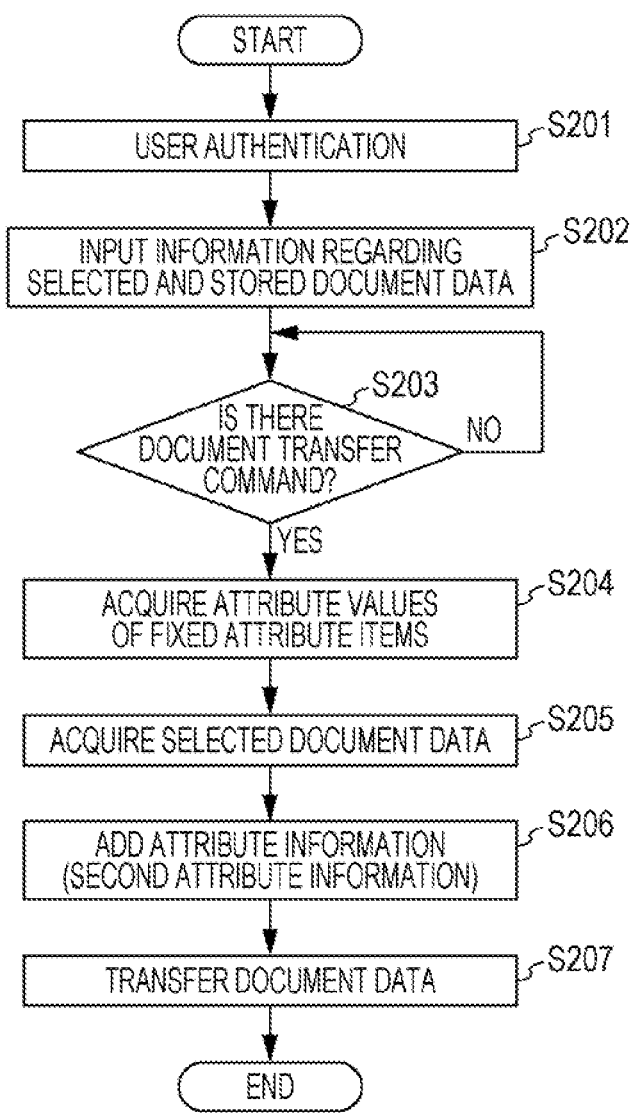
FIG. 17 is a flowchart for describing an operation performed when the image forming apparatus transfers stored image data to the server apparatus.

Next, an operation performed when the image forming apparatus 10a transfers stored image data to the server apparatus 50 will be described with reference to a flowchart illustrated in FIG. 17.

In a case where document data stored in the document-data storage unit 70 is transferred to an external apparatus in accordance with a flowchart as illustrated in FIG. 16, the user authentication unit 37 performs authentication of a user who tries to perform transfer processing (step S201).

Then, the input unit 35 causes the user to select, from among pieces of stored document data, which piece of document data is to be transferred, and inputs information regarding the selection (step S202).

Note that here FIG. 18 illustrates an example of attribute-information addition rules for the case where the attribute-information addition unit 32 adds second attribute information. In addition, FIG. 19 illustrates an example of an attribute-information definition table according to the present exemplary embodiment.

As illustrated in FIG. 18, in the present exemplary embodiment, the second attribute information is constituted only by fixed attribute items. In addition, it is clear with reference to the attribute-information definition table illustrated in FIG. 19 that attribute names of the fixed attribute items included in the second attribute information are "transfer date and time" and "forwarder".

Then, when a document transfer command is input by the input unit 35 (step S203), the attribute-information addition unit 32 acquires attribute values of the fixed attribute items, which are "transfer date and time" and "forwarder" (step S204). Then, the attribute-information addition unit 32 acquires selected document data from the document-data storage unit 70 (step S205), and adds the second attribute information to the acquired document data (step S206). Then, the data transfer unit 34 transfers to a specified destination the document data to which the second attribute information is added (step S207).

Note that in a case where when the second attribute information is added, document data has been encoded that is stored in the document-data storage unit 70 and to which the second attribute information is to be added, a process for decoding the encoded document data is added before addition of the second attribute information.

[Modification]

The above-described exemplary embodiment is described using a case where the present invention is applied to the image forming apparatus 10, which is a so-called multifunction machine. However, the present invention is not limited to this, and the present invention may be applied to any image reading apparatus with a scan function.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   a processor programmed to read image data from a document;
   add attribute information regarding a preset item to the read image data such that the attribute information forms part of an image of the image data, the attribute information including fixed attribute items which are added to the image data regardless of input by a user, required input attribute items which are required to be input by the user, and arbitrary input attribute items which the user may optionally input, wherein the fixed attribute items, the required input attribute items, and the arbitrary input attribute items are pre-set differently for each of a plurality of document types;
   wherein the attribute information is added by
      receiving the required input attribute items and the arbitrary input attribute items from the user as the attribute information to be added to the read image data, before the image data is read from the document,
      acquiring the fixed attribute items at the time of reading the image data from the document and update the attribute information to include the acquired fixed attribute items, and
      adding the updated attribute information to the read image data;
   and transfer to a specified destination the image data to which the attribute information is added.

2. The image reading apparatus according to claim 1, wherein
   the attribute information is information capable of being acquired when the processor reads the image data.

3. The image reading apparatus according to claim 1, wherein
   the attribute information is any piece of information or a combination of a plurality of pieces of information among document-type information about the document, apparatus information regarding an apparatus that has performed reading, information regarding a user who has commanded reading, and reading-date-and-time information.

4. The image reading apparatus according to claim 2, wherein
   the attribute information is any piece of information or a combination of a plurality of pieces of information among document-type information about the document, apparatus information regarding an apparatus that has performed reading, information regarding a user who has commanded reading, and reading-date-and-time information.

5. The image reading apparatus according to claim 1, wherein
   the processor inputs a document type selected for a document whose image data is to be read by the processor, and
   the processor inputs an item to be added as the attribute information and corresponding to the input document type,
   wherein the processor adds attribute information including the input item to the image data read by the processor.

6. The image reading apparatus according to claim 2, wherein
   the processor inputs a document type selected for a document whose image data is to be read by the processor, and
   the processor inputs an item to be added as the attribute information and corresponding to the input document type,
   wherein the processor adds attribute information including the input item to the image data read by the processor.

7. The image reading apparatus according to claim 1, wherein
   the processor further adds electronic-signature data to the image data to which the attribute information is added.

8. The image reading apparatus according to claim 2, wherein
   the processor further adds electronic-signature data to the image data to which the attribute information is added.

9. The image reading apparatus according to claim 3, wherein
   the processor further adds electronic-signature data to the image data to which the attribute information is added.

10. The image reading apparatus according to claim 4, wherein
    the processor further adds electronic-signature data to the image data to which the attribute information is added.

11. The image reading apparatus according to claim 5, wherein
    the processor further adds electronic-signature data to the image data to which the attribute information is added.

12. The image reading apparatus according to claim 6, wherein the processor further adds electronic-signature data to the image data to which the attribute information is added.

13. The image reading apparatus according to claim 1, wherein
the processor encodes image data obtained after addition of the attribute information is performed.

14. The image reading apparatus according to claim 2, wherein
the processor encodes image data obtained after addition of the attribute information is performed.

15. The image reading apparatus according to claim 3, wherein
the processor encodes image data obtained after addition of the attribute information is performed.

16. The image reading apparatus according to claim 5, wherein
the processor encodes image data obtained after addition of the attribute information is performed.

17. The image reading apparatus according to claim 7, wherein
the processor encodes image data obtained after addition of the attribute information is performed.

18. An image reading apparatus comprising:
a processor programmed to read image data from a document;
add first attribute information regarding a preset item to the read image data such that the attribute information forms part of an image of the image data, the first attribute information including fixed attribute items which are added to the image data regardless of input by a user, required input attribute items which are required to be input by the user, and arbitrary input attribute items which the user may optionally input, wherein the fixed attribute items, the required input attribute items, and the arbitrary input attribute items are pre-set differently for each of a plurality of document types;
wherein the first attribute information is added by
receiving the required input attribute items and the arbitrary input attribute items from the user as the attribute information to be added to the read image data, before the image data is read from the document,
acquiring the fixed attribute items at the time of reading the image data from the document and update the attribute information to include the acquired fixed attribute items, and
adding the updated attribute information to the read image data;
store the image data to which the first attribute information is added;
in a case where transfer of the stored image data is commanded, add second attribute information to the image data transfer of which is commanded; and
transfer to a specified destination the image data to which the second attribute information is added.

19. An image forming apparatus comprising:
a processor programmed to read image data from a document;
add attribute information regarding a preset item to the read image data such that the attribute information forms part of an image of the image data, the attribute information including fixed attribute items which are added to the image data regardless of input by a user, required input attribute items which are required to be input by the user, and arbitrary input attribute items which the user may optionally input, wherein the fixed attribute items, the required input attribute items, and the arbitrary input attribute items are pre-set differently for each of a plurality of document types;
wherein the attribute information is added by
receiving the required input attribute items and the arbitrary input attribute items from the user as the attribute information to be added to the read image data, before the image data is read from the document,
acquiring the fixed attribute items at the time of reading the image data from the document and update the attribute information to include the acquired fixed attribute items, and
adding the updated attribute information to the read image data;
transfer to a specified destination the image data to which the attribute information is added; and output onto a recording medium the image showing the read image data and the attribute information.

20. A non-transitory computer readable medium storing a program causing a computer to execute a process, the process comprising:
reading image data from a document;
adding attribute information regarding a preset item to the image data read in the reading such that the attribute information forms part of an image of the image data, the attribute information including fixed attribute items which are added to the image data regardless of input by a user, required input attribute items which are required to be input by the user, and arbitrary input attribute items which the user may optionally input, wherein the fixed attribute items, the required input attribute items, and the arbitrary input attribute items are pre-set differently for each of a plurality of document types;
wherein the first attribute information is added by
receiving the required input attribute items and the arbitrary input attribute items from the user as the attribute information to be added to the read image data, before the image data is read from the document,
acquiring the fixed attribute items at the time of reading the image data from the document and update the attribute information to include the acquired fixed attribute items, and
adding the updated attribute information to the read image data;
and transferring to a specified destination the image data to which the attribute information is added in the adding.

* * * * *